(12) United States Patent
Chen

(10) Patent No.: US 6,763,874 B1
(45) Date of Patent: Jul. 20, 2004

(54) MOVABLE BLIND

(76) Inventor: Tung-Hsing Chen, No. 198, Hsi Shih Road, Yung Kang, Tainan County (TW)

( * ) Notice: Subject to any disclaimer, the term of this patent is extended or adjusted under 35 U.S.C. 154(b) by 455 days.

(21) Appl. No.: 09/802,022

(22) Filed: Mar. 8, 2001

(51) Int. Cl.⁷ .................................................. B60J 3/00
(52) U.S. Cl. ........................ 160/370.22; 160/70; 160/79
(58) Field of Search .............................. 160/370.22, 66, 160/69, 70, 73, 78, 79, 22, 65; 296/97.7, 97.8

(56) References Cited

U.S. PATENT DOCUMENTS

| | | | | |
|---|---|---|---|---|
| 5,653,278 A | * | 8/1997 | Cheng | 160/370.22 |
| 5,752,560 A | * | 5/1998 | Cherng | 160/370.22 |
| 6,032,718 A | * | 3/2000 | Chen | 160/370.22 |

* cited by examiner

*Primary Examiner*—David M. Purol
(74) *Attorney, Agent, or Firm*—Alan Kamrath; Rider, Bennett, Egan and Arundel, LLP

(57) ABSTRACT

A movable blind fastened to the interior of an automobile comprises a cradle in the bottom and a bracket in each end of the cradle, with each bracket having a recess. Two engagement members each have a projection fitted into the recess and a double trough. Two plate members each have two pairs of opposite protuberances, a stop between the pairs of protuberances, and a shaft, with the protuberances and the stop being fastened to the double trough. Two pivot members each have slots disposed around a central bore and an enclosed box portion having transverse grooves disposed circumferentially. Two abutment members each have a central hole with the shaft inserted to fit in the central bore of pivot member and with the ridges engaged with the transverse grooves of the box portion. A blind cloth is fastened between a cross bar on the top and the cradle. The cross bar has a central activation member. Two hinged levers each have an upper section hinged to the end of the cross bar and a lower section fastened to the pivot member. The activation member is operable to extend or retract the levers for pivoting the pivot members about the brackets, thus sliding the ridges from a first position to a second position on the interior surface of the box portion. The ridges are maintained at the second position once force exerted on the activation member is released.

17 Claims, 7 Drawing Sheets

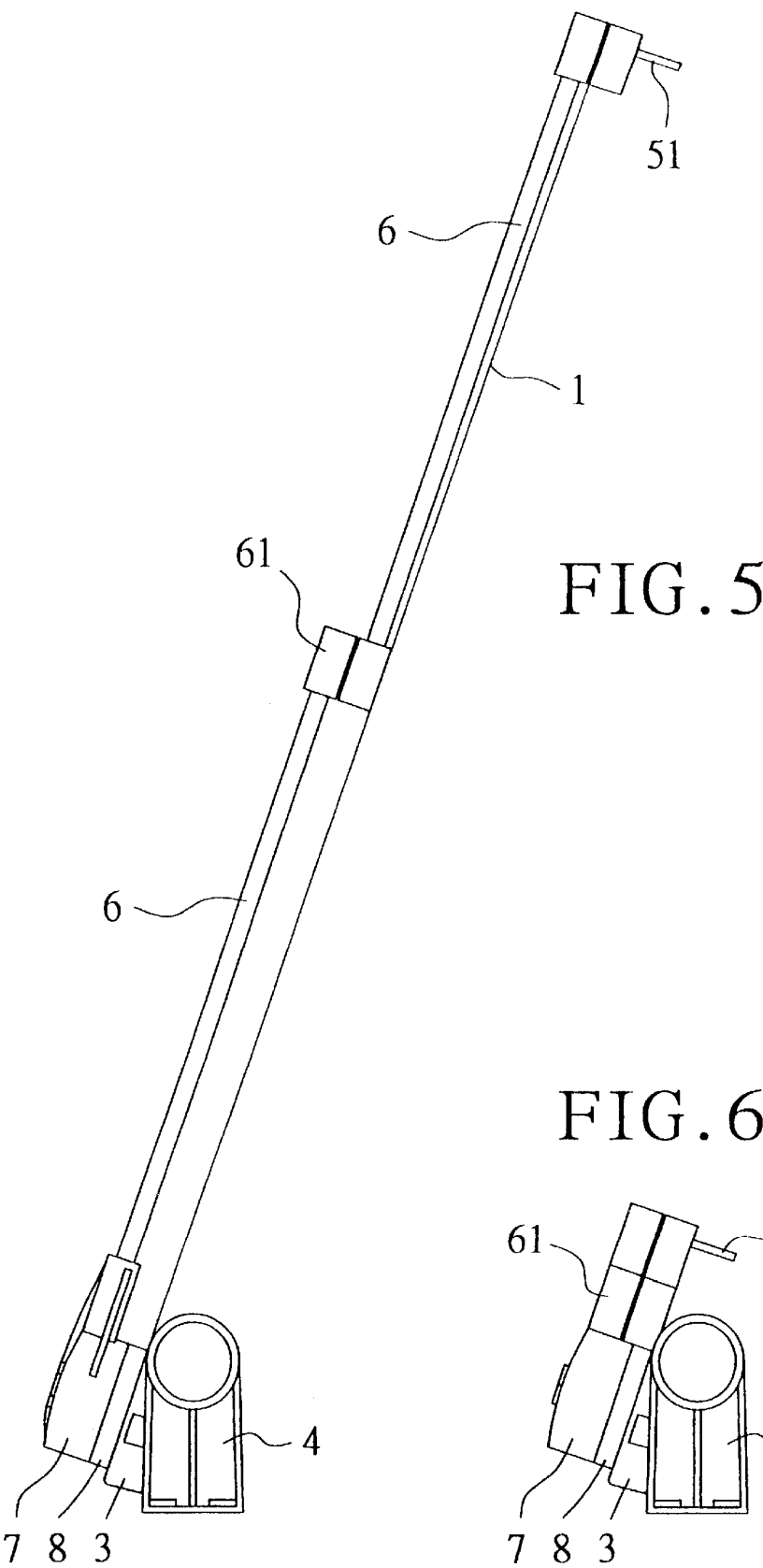

US 6,763,874 B1

MOVABLE BLIND

FIELD OF THE INVENTION

The present invention relates to blinds and more particularly to a movable blind fastened to the rear window of an automobile and having improved characteristics.

BACKGROUND OF THE INVENTION

A variety of movable blinds for an automobile are commercially available. However, the construction, operation, and durability thereof are still unsatisfactory for the purpose for which the invention is concerned. Thus, improvement is desirable.

SUMMARY OF THE INVENTION

It is an object of the present invention to provide a movable blind fastened to the interior of an automobile, comprising a cradle in the bottom; a bracket in each end of the cradle, the bracket having a recess; a pair of engagement members each having a projection fitted into the recess and a double trough on one side; a pair of plate members each having two pairs of opposite protuberances on one side, a stop between the pairs of the protuberances, and a shaft on the other side wherein the protuberances and the stop are fastened to the double trough; a pair of pivot members each having a central bore, a plurality of slots disposed around the central bore, and an enclosed box portion having a plurality of transverse grooves disposed circumferentially; a pair of abutment members each having a central hole with the shaft inserted to fit in the central bore of the pivot member and a plurality of ridges each engaged with the groove of the box portion; a cross bar on the top, with the cross bar together with the cradle fastening a blind cloth therebetween, the cross bar having a central activation member; and a pair of hinged levers each having an upper section hinged to the end of the cross bar and a lower section fastened to the pivot member; wherein the activation member is operable to extend or retract the levers for pivoting the pivot members about the brackets, thus sliding the ridges from a first position to a second position on the interior surface of the box portion and holding the ridges at the second position once the exerted force on the activation member is released.

It is a further object of the invention to provide a movable blind fastenable to the interior of an automobile which has a first bracket and a second bracket with each having a recess. A first engagement member has a projection sized to fit into the recess of the first bracket, and a second engagement member has a projection sized to fit into the recess of the second bracket. When the projection of the first engagement member is fitted into the recess of the first bracket and the projection of the second engagement member is fitted into the recess of the second bracket, the first and second engagement members each has a receptacle coaxial with the projections.

A cradle has a first end and a second end, with the first end sized so as to be received by the receptacle of the first engagement member and the second end sized so as to be received by the receptacle of the second engagement member, with an axis defined when the cradles are respectively inserted into the receptacles and the engagement members are inserted into the brackets.

A first pivot member is attached to the first engagement member so as to rotate perpendicularly to the axis with the first engagement member. In a similar manner, a second pivot member is attached to the second engagement member so as to rotate perpendicularly to the axis with the second engagement member.

A cross bar is opposed to the cradle and has a first end and a second end, and a blind cloth is fastened between the cradle and the cross bar.

First and second hinged levers each have a hinge separating an upper section and a lower section. The upper section of the first hinged lever is hinged to the first end of the cross bar, and the upper section of the second hinged lever is hinged to the second end of the cross bar. The lower section of the first hinged lever is attached to the first pivot member, and the lower section of the second hinged lever is attached to the second pivot member.

Finally, at least one of the hinges of the first hinged lever and the second hinged lever is biased. Thus, when the crossbar is moved to the extended position, the blind cloth is maintained in a raised position.

Yet another object of the invention is to provide a movable blind having a cross bar and a cradle, with a blind cloth extended between the cross bar and the cradle. At least one lever is provided which has first and second sections each having first and second ends. Each lever includes a hinge between the second ends of the first and second sections, with the hinge providing pivotable movement about a first axis. The first end of the first section is pivotally attached to the cross bar about a second axis which is parallel to the first axis. The first end of the second section is pivotally attached to the cradle about a third axis parallel to the first and second axes. One of the first, second and third axes includes a pivot member having a plurality of transverse grooves disposed circumferentially to the one axis. An abutment member includes a plurality of ridges each engaged with the transverse grooves of the pivot member. The other two of the first, second and third axes are biased, with an exerted force causing the ridges to ratchet in the transverse grooves to increase or decrease the spacing between the cross bar and the cradle and with the ridges in the transverse grooves maintaining the relative position of the cross bar and the cradle when the force is released.

The above and other objects, features and advantages of the present invention will become apparent from the following detailed description taken with the accompanying drawings.

BRIEF DESCRIPTION OF THE DRAWINGS

FIG. 5 is a side view showing the blind of FIG. 1 in an extended state;

FIG. 6 is a view similar to FIG. 5 where the blind is in a retracted state;

DETAILED DESCRIPTION OF THE PREFERRED EMBODIMENTS

Figure 1:
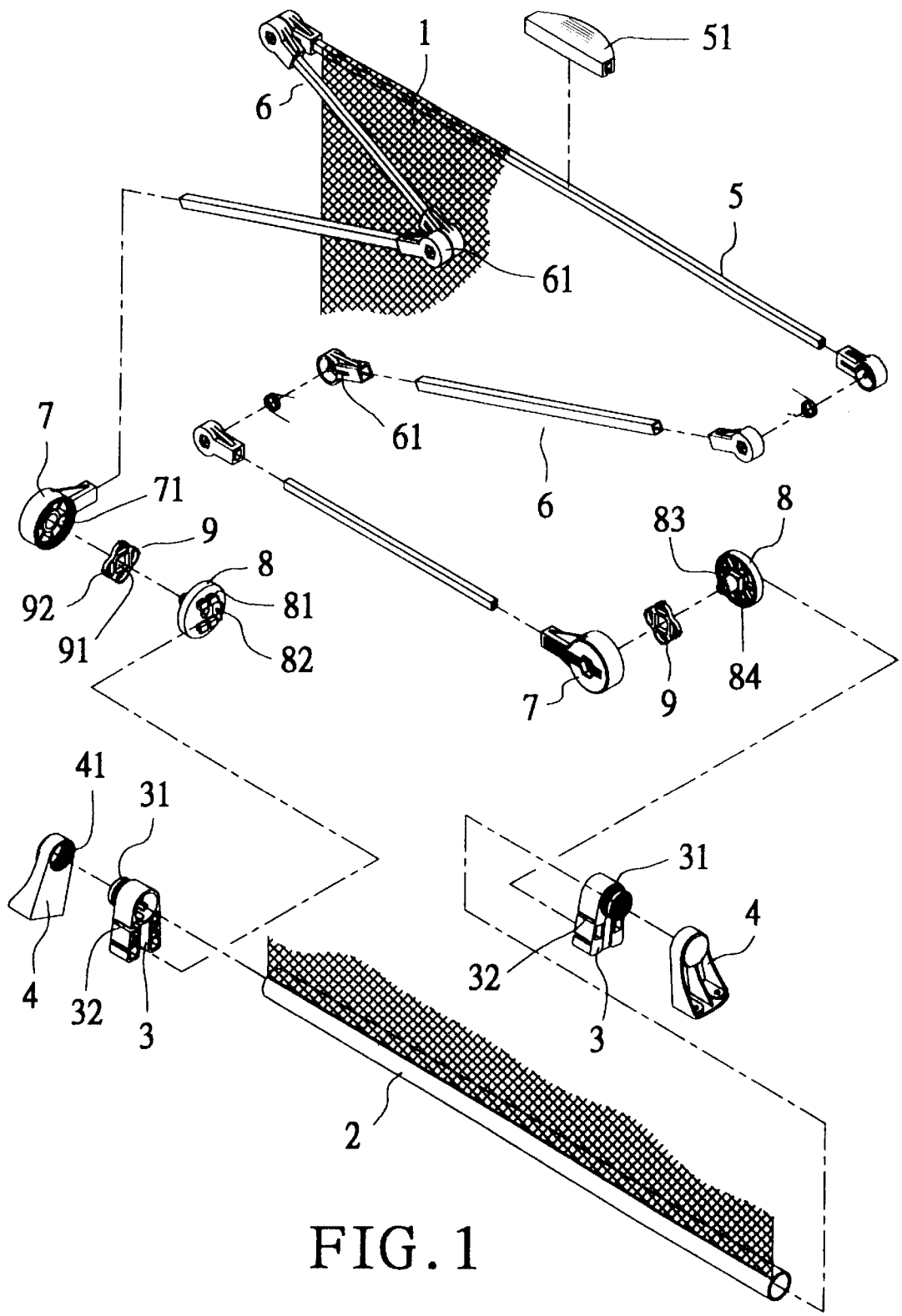
FIG. 1 is an exploded perspective view of a preferred embodiment of a movable blind according to the invention.
Figure 2:
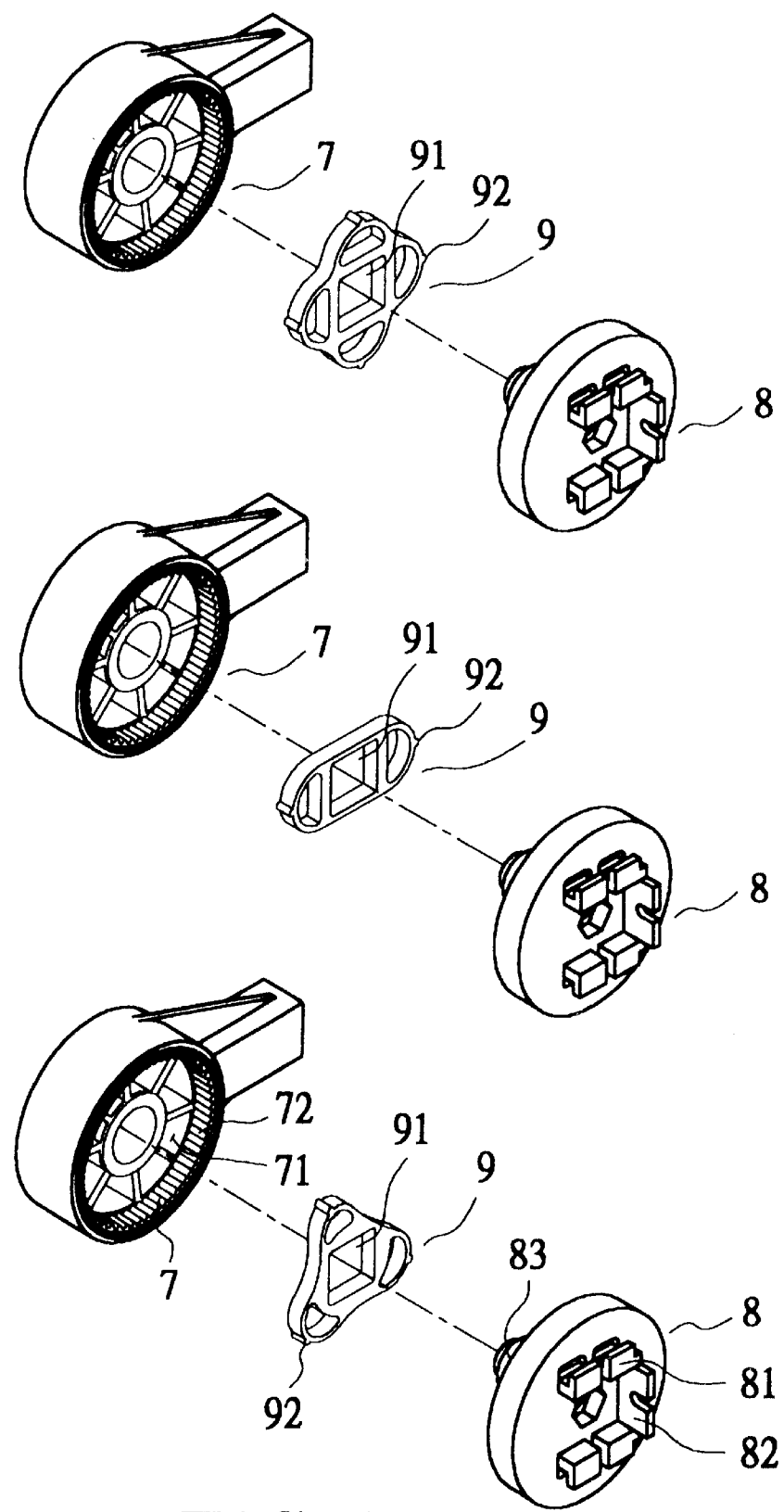
FIG. 2 is an exploded perspective view of three components of FIG. 1 where three configurations of the abutment member are shown.
Figure 3:
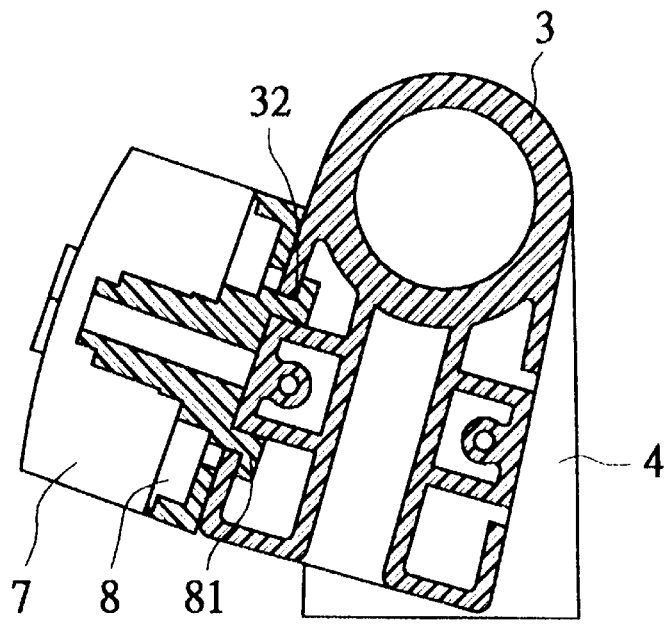
FIG. 3 is a sectional view showing the bracket and associated components of FIG. 1.
Figure 4:
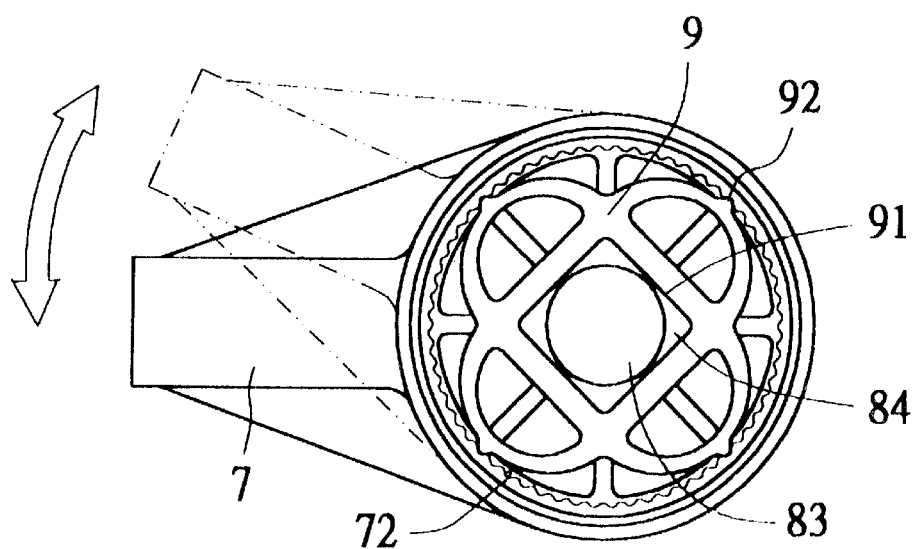
FIG. 4 is a plan view schematically showing the pivoting of pivot member of FIG. 1.
Figure 7:
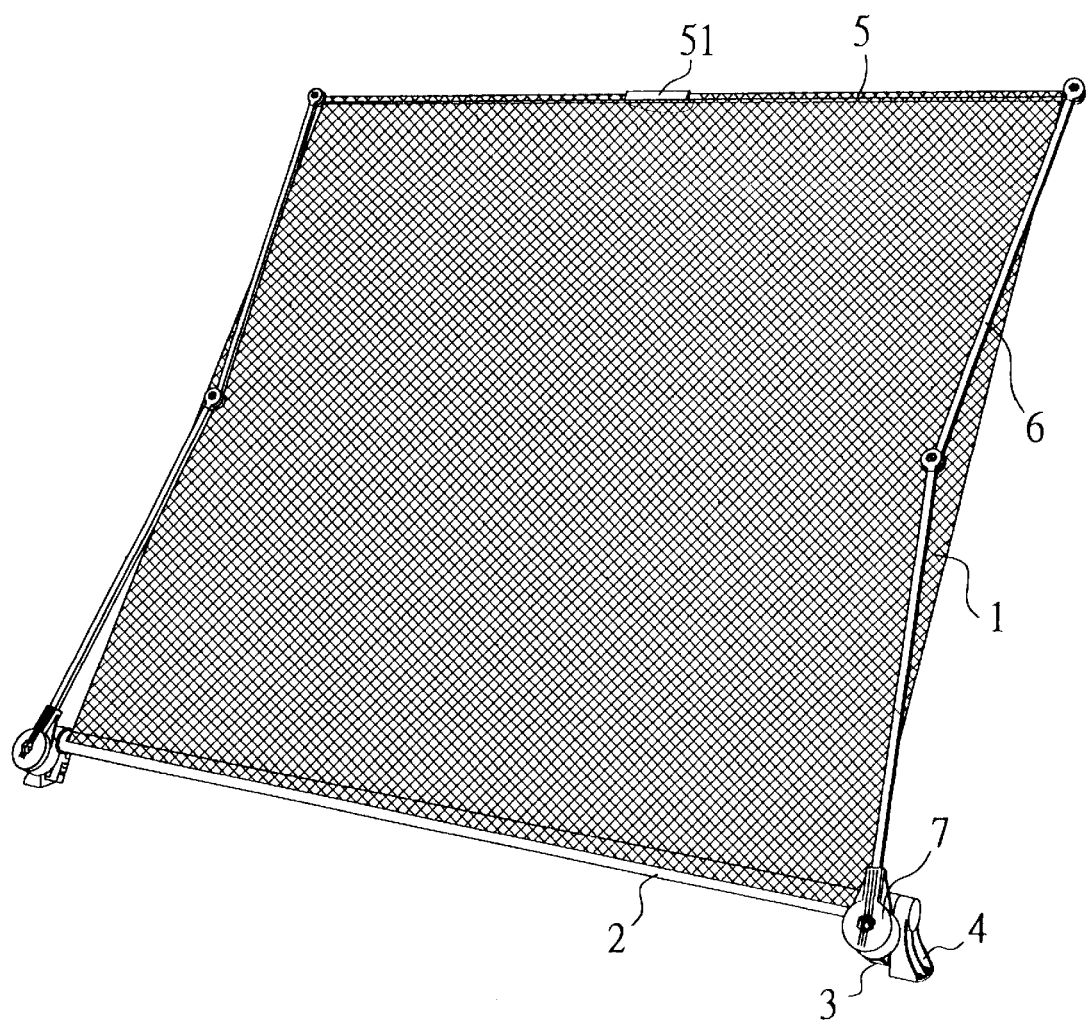
FIG. 7 is a perspective view of the blind of FIG. 1 in a fully extended state.
Figure 8:
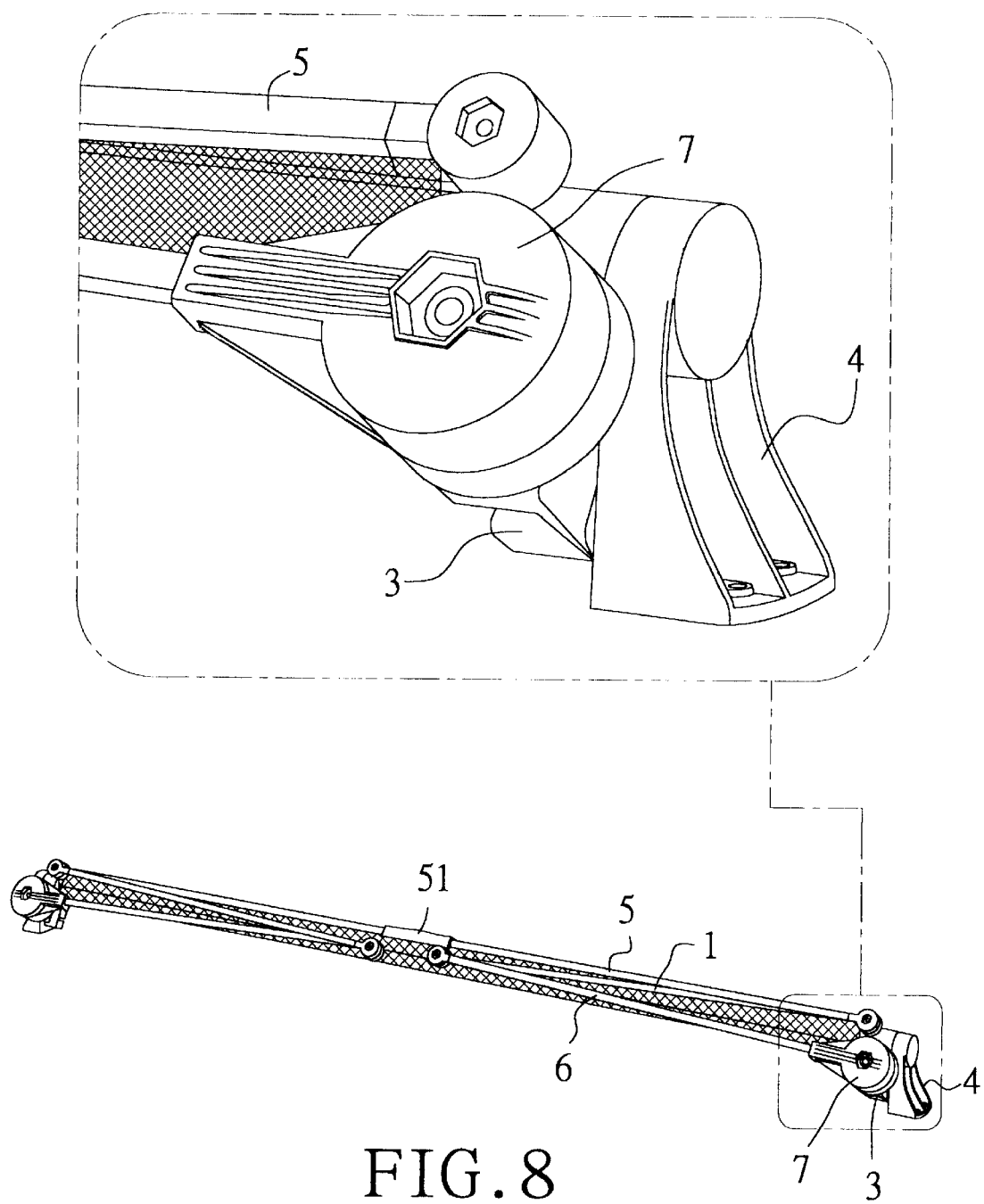
FIG. 8 is a perspective view of the blind of FIG. 1 in a retracted state with a portion enlarged to show details thereof.
Figure 9:
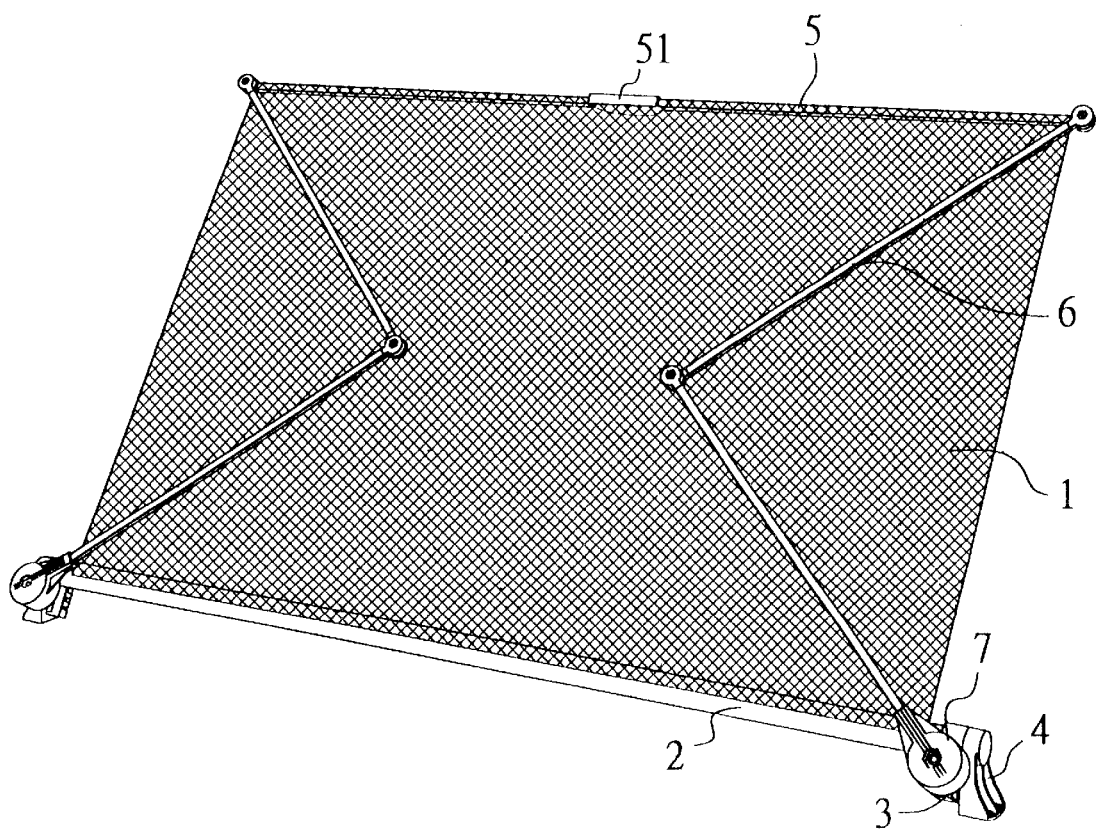
FIG. 9 is a perspective view of the blind of FIG. 1 with the blind in a partially extended state.

Referring to FIGS. 1 to 4, there is shown a movable blind defining a top and a bottom constructed in accordance with the invention. The blind includes a cradle 2 in the bottom, and a bracket 4 in either end of the cradle 2, with the bracket 4 fastened to the interior of an automobile adjacent the rear window and having a recess 41. A pair of engagement members 3 each have a projection 31 fitted into the recess 41 and a double trough 32 on one side. A pair of plate members 8 each have two pairs of opposite protuberances 81 on one side, a stop 82 between the pairs of opposite protuberances 81, and a shaft 83 on the opposite other side wherein protuberances 81 and the stop 82 are fastened to the double trough 32. A pair of pivot members 7 each have a plurality of slots 71 disposed around the central bore and an enclosed box portion 72 having a plurality of transverse grooves disposed circumferentially. A pair of abutment members 9 each have a central hole 91 and a plurality of ridges 92 each engaged with the groove of the box portion 72 (the number of ridges may be varied in different configurations as shown in FIG. 2 specifically). The shaft 83 includes a portion 84 adjacent to the side of the plate member 8 inserted to fit in the central bore of the pivot member 7. A cross bar 5 is provided on the top. Blind cloth 1 is fastened between the cradle 2 and the cross bar 5. The cross bar 5 has a central activation member 51 shaped to ease grasping by hand, and a pair of two-section levers 6 each have a hinge 61 for joining two sections thereof wherein the upper section is hinged to the end of cross bar 5 and the lower section is fastened to the pivot member 7.

Referring to FIGS. 5 to 9 in conjunction with FIGS. 1 to 4, the operation of the blind of the invention will now be described. The user may hold the activation member 51 to extend or retract the blind (i.e., levers 6). Accordingly, the pivot member 7 may pivot about the bracket 4, i.e., ridges 92 are slid from one position to another position in the box portion 72. Note that once the exerted force for extending or retracting the levers 6 is released, the relative position of the lever 6 with respect to the pivot member 7 is still maintained. Thus, the user may conveniently and easily extend or retract the blind to a desired position.

While the invention has been described by means of specific embodiments, numerous modifications and variations could be made thereto by those skilled in the art without departing from the scope and spirit of the invention as set forth in the claims.

What is claimed is:

1. A movable blind fastened to the interior of an automobile, comprising:
   a cradle having a first end and a second end;
   a bracket at each of said first and second ends of said cradle, each said bracket having a recess;
   first and second engagement members each having a projection fitted into said recess and having a double trough on one side;
   first and second plate members each having two pairs of opposite protuberances on one side, a stop between said pairs of said protuberances, and a shaft on said other side, wherein said protuberances and said stop are fastened to said double trough;
   first and second pivot members each having a central bore, a plurality of slots disposed around said central bore, and an enclosed box portion having a plurality of transverse grooves disposed circumferentially;
   first and second abutment members each having a central hole and a plurality of ridges each engaged with said groove of said box portion, with said shaft inserted into said central bore of said pivot member;
   a cross bar opposed to said cradle and having a first end and a second end;
   a blind cloth fastened between said cradle and said cross bar; and
   first and second hinged levers each having an upper section and a lower section, with the upper section of said first hinged lever hinged to said first end of said cross bar and the upper section said second hinged lever hinged to said second end of said cross bar, and said lower section of said first hinged lever fastened to said first pivot member and said lower section of said second hinged lever fastened to said second pivot member;
   wherein raising said cross bar to an extended position causes said first and second levers to pivot said first and second pivot members about said first and second brackets respectively, thus sliding said ridges from a first position to a second position on said interior surface of said box portion and holding said ridges at said second position once said exerted force is released.

2. The movable blind of claim 1 wherein said cradle is parallel with said cross bar when fully extended.

3. The movable blind of claim 1 wherein said cradle and said cross bar are substantially the same length.

4. The movable blind of claim 1 wherein said first and second hinged levers are biased.

5. The movable blind of claim 4 wherein said first and second hinged levers are biased by springs.

6. A movable blind fastenable to the interior of an automobile, comprising:
   a first bracket and a second bracket each having a recess;
   a first engagement member having a projection sized to fit into said recess of said first bracket and a second engagement member having a projection sized to fit into said recess of said second bracket, wherein when said projection of said first engagement member is fitted into said recess of said first bracket and said projection of said second engagement member is fitted into said recess of said second bracket, said first and second engagement members each have a receptacle coaxial with said projections;
   a cradle having a first end and a second end, said first end sized so as to be received by said receptacle of said first engagement member and said second end sized so as to be received by said receptacle of said second engagement member, with an axis defined when the first and second ends of said cradle are respectively inserted into said receptacles and said first and second engagement members are inserted into said first and second brackets;
   a first pivot member attached to said first engagement member so as to rotate perpendicularly to said axis with said first engagement member and a second pivot member attached to said second engagement member so as to rotate perpendicularly to said axis with said second engagement member;
   a cross bar opposed to said cradle and having a first end and a second end;
   a blind cloth fastened between said cradle and said cross bar; and
   first and second hinged levers each having a hinge separating an upper section and a lower section, said upper section of said first hinged lever hinged to said first end of said cross bar and said upper section of said second hinged lever hinged to said second end of said cross bar, said lower section of said first hinged lever attached to said first pivot member and said lower section of said second hinged lever attached to said second pivot member, with at least one of said hinges of said first hinged lever and of said second hinged lever being biased;

wherein moving said cross bar to an extended position from the cradle causes said blind cloth to be maintained in a raised position.

7. The movable blind of claim 6 wherein said cradle is rotatably held by said receptacles.

8. The movable blind of claim 6 wherein said first and second engagement members are able to rotate within said recesses.

9. The movable blind of claim 6 wherein said cradle is parallel with said cross bar in said extended position.

10. The movable blind of claim 6 wherein said cradle and said cross bar are substantially the same length.

11. The movable blind of claim 6 wherein said first and second hinged levers are biased by springs.

12. A movable blind, comprising:

a cross bar;

a cradle;

a blind cloth extended between said cross bar and said cradle; and at least a first lever including first and second sections each having first and second ends, with each said lever including a hinge between said second ends of said first and second sections pivotable about a first axis, with said first end of said first section pivotally attached to said cross bar about a second axis parallel to said first axis, with said first end of said second section pivotally attached to said cradle about a third axis parallel to said first and second axes, with one of said first, second and third axes including a pivot member having a plurality of transverse grooves disposed circumferentially to said one axis and an abutment member including a plurality of ridges each engaged with said transverse grooves of said pivot member, with the other two of said first, second and third axes being biased, with an exerted force causing said ridges to ratchet in said transverse grooves to increase or decrease said spacing between said cross bar and said cradle and with the ridges in the transverse grooves maintaining the relative position of said cross bar and said cradle when the force is released.

13. The movable blind of claim 12 wherein said cradle is mounted in at least one bracket and is pivotable about a fourth axis perpendicular to said third axis.

14. The movable blind of claim 13 with said pivot member and said abutment member located on said third axis.

15. The movable blind of claim 13 further comprising: at least a first engagement member rotatably fixed to said cradle and rotatable in said bracket and with one of said pivot member and said abutment member being fixed to said engagement member.

16. The movable blind of claim 12 wherein said pivot member includes an enclosed box member having the plurality of transverse grooves disposed parallel to said one axis.

17. The movable blind of claim 12 further comprising: a second lever.

* * * * *